(12) United States Patent
Wang et al.

(10) Patent No.: US 6,718,317 B1
(45) Date of Patent: Apr. 6, 2004

(54) METHODS FOR IDENTIFYING PARTIAL PERIODIC PATTERNS AND CORRESPONDING EVENT SUBSEQUENCES IN AN EVENT SEQUENCE

(75) Inventors: Wei Wang, White Plains, NY (US); Jiong Yang, White Plains, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 09/585,757

(22) Filed: Jun. 2, 2000

(51) Int. Cl.[7] .................................................. G06F 9/44
(52) U.S. Cl. ............................................. 706/50; 706/55
(58) Field of Search ...................... 706/50, 55; 382/107

(56) References Cited

U.S. PATENT DOCUMENTS

| | | | | | |
|---|---|---|---|---|---|
| 5,259,040 A | * | 11/1993 | Hanna | ......................... | 382/107 |
| 5,379,366 A | * | 1/1995 | Noyes | ......................... | 706/55 |
| 5,517,642 A | * | 5/1996 | Bezek et al. | ................... | 707/3 |
| 5,579,441 A | * | 11/1996 | Bezek et al. | ................... | 706/50 |
| 5,594,837 A | * | 1/1997 | Noyes | ......................... | 706/55 |
| 5,615,309 A | * | 3/1997 | Bezek et al. | ................... | 706/50 |
| 5,819,266 A | | 10/1998 | Agrawal et al. | | |
| 5,832,482 A | | 11/1998 | Yu et al. | | |
| 5,878,406 A | * | 3/1999 | Noyes | ......................... | 706/55 |
| 6,185,559 B1 | | 2/2001 | Brin et al. | | |
| 2001/0043721 A1 | * | 11/2001 | Kravets et al. | ............. | 382/107 |

FOREIGN PATENT DOCUMENTS

| | | |
|---|---|---|
| EP | 730240 A2 | 4/1996 |
| JP | 08263346 | 10/1996 |
| JP | 10240770 | 9/1998 |
| JP | 10312386 | 11/1998 |

OTHER PUBLICATIONS

GeoMiner: A System Prototype for Spatial Data Mining, (1997) Jiawei Han, Krzysztof Koperski, Nebojsa Stefanovic, (GeoMiner Research Group, Database Systems Research Laboratory, School of Computing Science, Simon Frazer University), pps. 1–4.*
DBMiner: A System for Mining Knowledge in Large Relational Databases, Jiawei Han, Proc. 1996 Int'l Conf. on Data Mining and Knowledge Discovery (KDD'96).*
Mining Frequent Patterns without Candidate Generation, (1999) iawei Han, Jian Pei, Yiwen Yin, 2000 ACM SIGMOD Intl. Conference on Management of Data.*
Discovering Patterns in Sequneces of Events, Thomas G. Dietterich; Ryszard S. Michalski, Artificial Intelligence (1985) Elsevier Science Publisher B.V.*
Agrawal et al., "Mining Sequential Patterns", Proceedings of the International Conference on Data Engineering (ICDE), Taipei, Taiwan, pp. 3–14, Mar. 1995.
Han et al., "Efficient Mining of Partial Periodic Patterns in Time Series Database", Proc. Int. Conf. On Data Engineering, 106–115, Apr. 1999.

* cited by examiner

*Primary Examiner*—Ramesh Patel
*Assistant Examiner*—Michael B. Holmes
(74) *Attorney, Agent, or Firm*—F. Chau & Associates, LLP

(57) ABSTRACT

A method is provided for identifying partial periodic patterns in an event sequence, wherein pattern includes a list of events from the event sequence. At least one subsequence of the event sequence and at least pattern in the at least one subsequence is identified, such that the at least one pattern exceeds a minimum number of repetitions in the at least one subsequence, and a distance between successive repetitions of the at least one pattern in the at least one subsequence does not exceed a predefined distance threshold. At least one of the at least one pattern and the at least one subsequence is stored.

23 Claims, 15 Drawing Sheets

METHODS FOR IDENTIFYING PARTIAL PERIODIC PATTERNS AND CORRESPONDING EVENT SUBSEQUENCES IN AN EVENT SEQUENCE

CROSS-REFERENCE TO RELATED APPLICATIONS

This application is related to the application Ser. No. 09/585,756 entitled "Methods for Identifying Partial Periodic Patterns of Infrequent Events in an Event Sequence", which is commonly assigned and concurrently filed herewith, and the disclosure of which is incorporated herein by reference.

BACKGROUND

1. Technical Field

The present invention generally relates to data mining and, more particularly, to identifying partial periodic patterns and corresponding event subsequences in an event sequence.

2. Background Description

Periodic pattern discovery is an important problem in mining time series data. The discovery of sequential patterns in time series data was first described by Agrawal et al., in "Mining Sequential Patterns", Proceedings of the International Conference on Data Engineering (ICDE), Taipei, Taiwan, pp. 3–14, March 1995. The input data in a mining process is a set of sequences, called data sequences. Each data sequence is a list of transactions. Typically, there is a transaction time associated with each transaction. A sequential pattern also consists of transactions, i.e., sets of events. In general, time series data mining requires that all sequential patterns with a user-specified minimum "support" be found. The support of a sequential pattern is the number of occurrences of the pattern within an event sequence.

According to the prior art, methods have been created for efficiently mining partial periodic patterns by exploring properties related to partial periodicity, such as the Apriori Property and the max-subpattern hit set property. Such methods are described by Han et. al., in "Efficient Mining Partial Periodic Patterns in Time Series Database", Proc. Int. Conf. on Data Engineering, 106–115, 1999. However, these methods require a predefined period. In addition, these methods assume that the disturbance within a series of repetitions of a pattern, if any, would not result in the loss of synchronization of subsequent occurrences of the pattern with respect to the previous occurrences of the pattern. For example, "Joe Smith reads the newspaper every morning" is a periodic pattern. Even though Joe may occasionally not read the newspaper every morning, this disturbance will not affect the fact that Joe reads the newspaper during subsequent mornings. In other words, disturbance is allowed only in terms of "missing occurrences" but not in terms of the "insertion of random noise events". However, this assumption is often too restrictive since it results in a failure to detect an interesting pattern, when some occurrences of the pattern are misaligned due to inserted noise events.

With respect to a more desirable approach to data mining, consider the following example, which is directed to the application of inventory replenishment. The history of inventory refill orders can be regarded as an event sequence. Assume that the time between two replenishments of cold medicine is generally one month. The refill order is filed at the beginning of each month before a major outbreak of flu which, in turn, causes an additional refill at the third week. Afterwards, even though the replenishment frequency is back to once each month, the refill time shifts to the 3rd week of each month (and not the beginning of each month, as was the case previously). Therefore, it would be desirable for the pattern to still be recognized when the disturbance is within some reasonable threshold.

In addition, the system behavior may change over time. Some patterns may not be present all of the time (but rather within some time interval). Therefore, it would be desirable to find periodic patterns that are significant within a subsequence of events, even if such patterns contain disturbances having a length up to a certain predefined threshold.

SUMMARY OF THE INVENTION

The present invention is directed to identifying partial periodic patterns and corresponding event subsequences in an event sequence. That is, the subsequence in which each pattern is significant is also identified.

According to a first aspect of the invention, there is provided a method for identifying partial periodic patterns in an event sequence, wherein pattern includes a list of events from the event sequence. At least one subsequence of the event sequence and at least pattern in the at least one subsequence is identified, such that the at least one pattern exceeds a minimum number of repetitions in the at least one subsequence, and a distance between successive repetitions of the at least one pattern in the at least one subsequence does not exceed a predefined distance threshold. At least one of the at least one pattern and the at least one subsequence is stored.

According to a second aspect of the invention, each of the events in a given pattern is one of distinct and non-distinct, and each non-distinct event matches any of the distinct events.

According to a third aspect of the invention, there is provided a method for identifying partial periodic patterns in an event sequence, wherein each pattern includes a list of events from the event sequence. A set CPP of candidate pattern periods and a plurality of sets CE of candidate events are identified, wherein each candidate pattern period in the set CPP corresponds to one of the plurality of sets CE of candidate events. At least one pattern comprised of the candidate events in one of the plurality of sets CE and having a same period as the corresponding candidate pattern period in the set CPP is identified. Further, at least one subsequence of the event sequence that comprises the at least one pattern is identified. The identification of the at least one pattern and the at least one subsequence is such that the at least one pattern exceeds a minimum number of repetitions in the at least one subsequence, and a distance between successive repetitions of the at least one pattern in the at least one subsequence does not exceed a predefined distance threshold. At least one of the at least one pattern and the at least one subsequence is stored.

According to a fourth aspect of the invention, the period of each of the candidate pattern periods in the set CPP is shorter than a pre-specified maximum period length.

According to a fifth aspect of the invention, the at least one subsequence is the longest event subsequence including the at least one pattern.

According to a sixth aspect of the invention, the step of identifying the set CPP of candidate pattern periods and the plurality of sets CE of candidate events includes the step of initializing a plurality of distance counters. Each distance counter is associated with one of a plurality of event and period combinations, each combination including one of the periods from the set CPP and one of the events from the corresponding set CE of candidate events. A value of each of the distance counters is updated to reflect a distance from the associated event to a previous occurrence of the associated event. The event and period combinations are identified such that the value of the distance counters associated with each of the identified combinations exceeds the minimum number of repetitions.

According to a seventh aspect of the invention, each of the periods in the plurality of event and period combinations is less than the pre-specified maximum period length.

According to an eighth aspect of the invention, the step of identifying the set CPP of candidate pattern periods and the plurality of sets CE of candidate events includes the step of identifying singular patterns and subsequences that comprise the singular patterns, wherein each singular pattern has only one position filled by one of the events in the event sequence. Complex patterns are identified and validated, wherein each complex pattern has more than one position filled by one of the events in the event sequence.

According to a ninth aspect of the invention, the method further comprises the step of validating singular patterns.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to identifying partial periodic patterns and corresponding event subsequences in an event sequence. That is, the subsequence in which each pattern is significant is also identified.

It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 1:
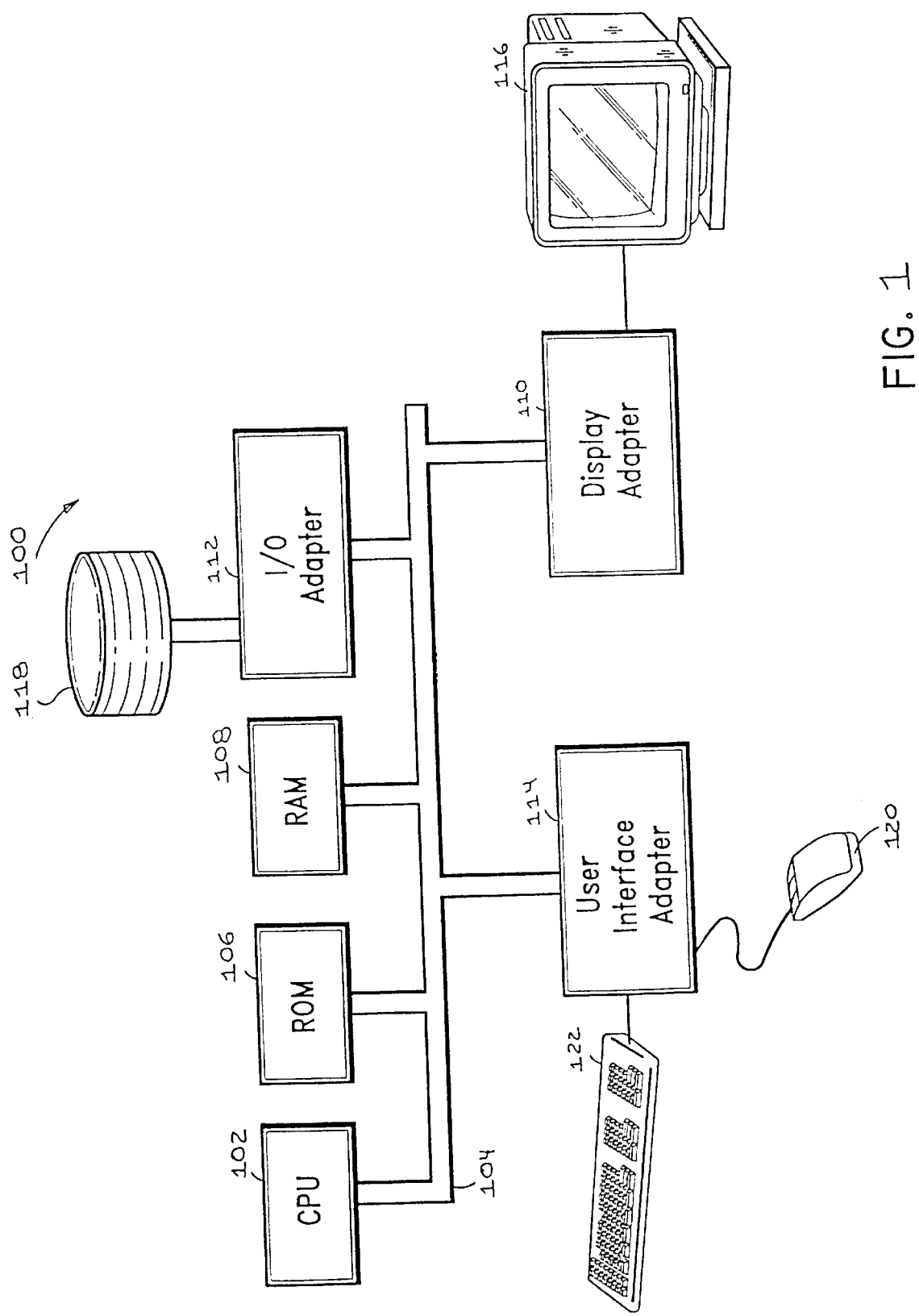
FIG. 1 is a block diagram of a computer processing system 100 to which the present invention may be applied according to an illustrative embodiment thereof.

FIG. 1 is a block diagram of a computer processing system 100 to which the present invention may be applied according to an illustrative embodiment thereof. The computer processing system includes at least one processor (CPU) 102 operatively coupled to other components via a system bus 104. A read-only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100. It is to be appreciated that other configurations of computer processing system 100 may be employed in accordance with the present invention while maintaining the spirit and the scope thereof.

A brief description of the invention will now be given to introduce the reader to the concepts of the invention. In identifying asynchronous patterns in event sequences, the invention utilizes two parameters, i.e., min_rep and max_dis, to qualify a valid pattern and the event subsequence containing the valid pattern. The event subsequence can be viewed as a list of valid segments of perfect repetitions interleaved by disturbance. Each valid segment is required to include at least min_rep contiguous repetitions of the pattern, wherein the length of each "piece" of disturbance in a valid segment may not exceed max_dis. That is, min_rep is the minimum number of repetitions that a pattern must exhibit in a given subsequence of a given event sequence, and max_dis is the maximum distance (preferably defined in terms of events) between successive repetitions of a pattern (i.e., valid segments) in a given subsequence of a given event sequence.

The motivation for using min_rep is that a pattern needs to repeat itself at least a certain number of times to demonstrate its significance and periodicy. The motivation for using max_dis is that the disturbance between two valid segments has to be within some reasonable bound. Otherwise, it would be more appropriate to treat such a disturbance as a signal of "change of system behavior", instead of random noise injected into some persistent behavior. The parameter max_dis acts as the boundary to separate these two phenomena. The appropriate values of these two parameters are application dependent and are, thus, advantageously allowed to be specified by a user. For patterns satisfying these two requirements, the method of the invention will return the subsequence with the maximum overall repetitions. Note that, due to the presence of disturbance, a subsequent valid segment in an event sequence may not be well synchronized with respect to previous valid segments in that event sequence (because, e.g., some position shifting occurs). Such phenomena impose a greater challenge to the mining process.

The input to a mining problem is referred to as an input sequence. An example input sequence is as follows: $a_2 a_1 a_1^* a_1 a_1^* a_1 a_1^* a_3$. A pattern in the input sequence is, for example, $a_1 a_1^*$, which repeats 3 times in the event sequence. The reference character * represents an "eternal event". An eternal event is a virtual event that matches any event. Thus, an eternal event can be used to represent the "don't care" position in a pattern. An eternal event may also be referred to as "non-distinct", in which case an event such as $a_1$ may also be referred to as "distinct".

According to the invention, a pattern is allowed to be partially filled to enable a more flexible model of asynchronous periodic patterns. For instance, (cold_medi, *, *, *) is a partial monthly pattern that reveals that cold medicine is reordered on the first week of each month while replenishment orders during the other three weeks do not exhibit strong regularity. However, since the invention allows for the shifted occurrence of a valid segment, this flexible model poses a difficult problem to be solved. For a given pattern P, its associated valid segments may overlap. To find the valid subsequence with the most repetitions for P, we have to decide which portion of a valid segment, should be selected.

While it is relatively easy to find the set of valid segments for a given pattern, substantial difficulties exist in how to assemble these valid segments to form the longest valid subsequence. Since the number of different assemblies (of valid segments) grows exponentially with increasing period length, the process of mining the longest subsequence becomes a daunting task (even for a very simple pattern such as $(d_1, *, *)$) To solve this problem for a given pattern, an efficient mining method is provided to identify subsequences that may be extended to become the longest subsequence in an event sequence, and to organize the identified subsequences in such a way that the longest valid subsequence can be identified by a single scan of the input sequence. According to the method, only a small portion of all extendible subsequences need to be examined.

Another advantage of the mining method of the invention is that it can discover all periodic patterns irrespective of the period length. This is significant because, in practice, the period is not always available a priori. Thus, the period is also mined from the data.

Returning to the inventory replenishment example described above, the stock of different merchandise may be replenished at different frequencies (which may be unknown ahead of time and may vary on occasion). A period may span thousands of events in a long time series or the period may span just a few events. A distance-based pruning mechanism is provided to discover all possible periods and the set of events that are likely to appear in some pattern of each possible period. To find the longest valid subsequence for all possible patterns, a level-wise approach is employed. The Apriori property also holds on patterns of the same period. That is, a valid segment of a pattern is also a valid segment of any pattern with fewer events specified in the pattern. For example, a valid segment for $(d_1, d_2, *)$ will also be one for $(d_1, *, *)$. Then, for each likely period, all valid patterns with their longest supporting subsequences can be iteratively mined.

A brief description of the present invention will now be given with respect to FIG. 2. More detailed descriptions of the present invention follow with respect to FIGS. 3–15.

Figure 2:
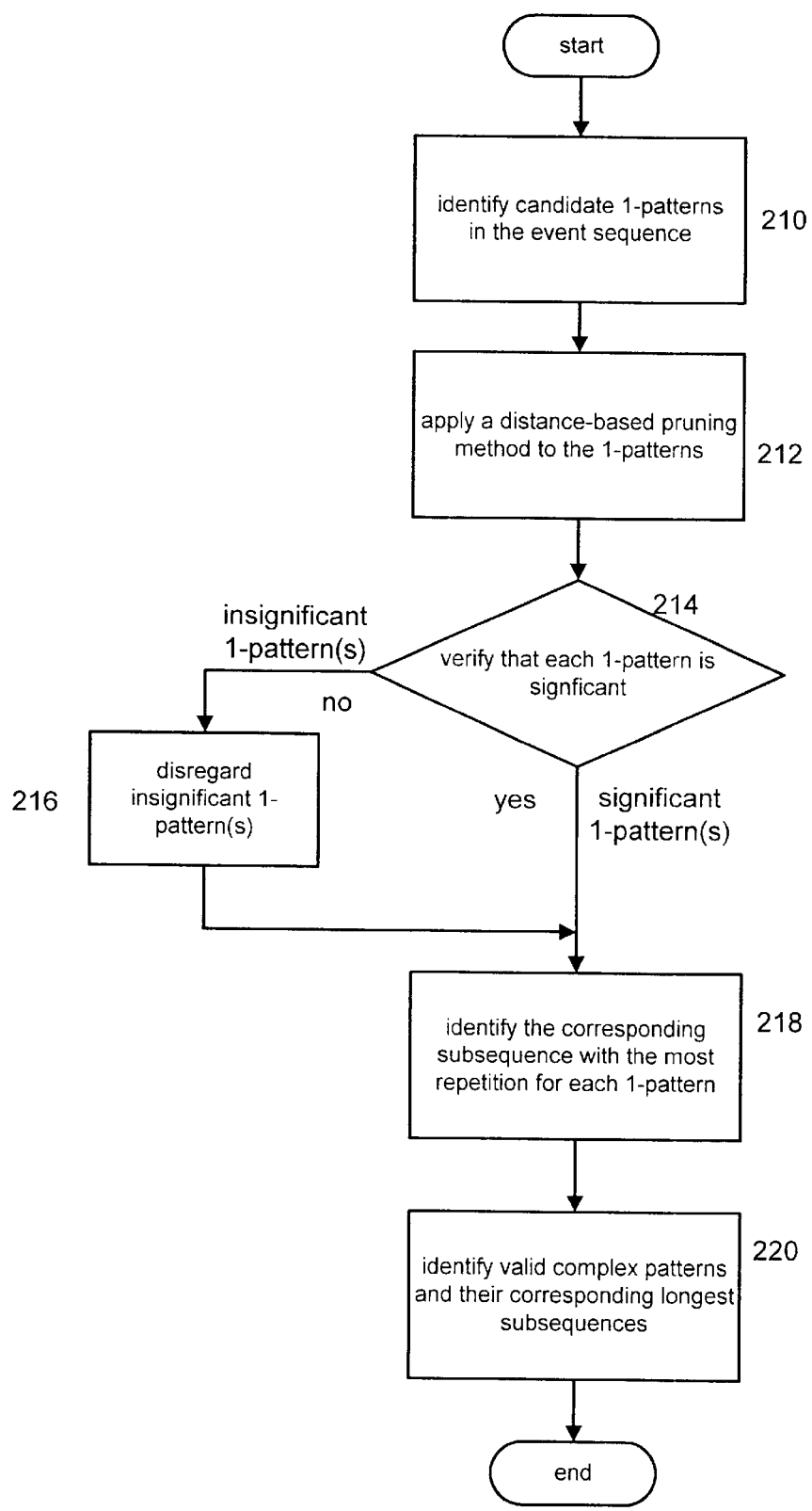
FIG. 2 is a diagram illustrating the overall process of mining asynchronous periodic patterns in an input event sequence, according to an illustrative embodiment of the invention.

FIG. 2 is a diagram illustrating the overall process of mining asynchronous periodic patterns in an input event sequence, according to an illustrative embodiment of the invention. Candidate 1-patterns (hereinafter "1-patterns") are identified from the event sequence (step 210). A 1-pattern is a pattern that consists of one (1) event (1-patterns are also referred to herein as "singular patterns"). For example, (d, *, *) is considered a 1-pattern. Since there is a total of $O(T \times L_{max}^2)$ 1-patterns, all of the 1-patterns cannot be loaded into memory at once. Accordingly, a distance-based pruning method is applied to the 1-patterns to reduce the number of 1-patterns (step 212).

Next, for each 1-pattern, it is verified whether the 1-pattern is significant (step 214). A pattern is considered significant for the purposes of the invention when the pattern satisfies min_rep and max_dis with respect to a subsequence of the event sequence that contains the pattern. It is to be noted that the terms "significant" and "valid" are used interchangeably herein.

The 1-patterns that are not significant are disregarded (step 216). In contrast, for each significant 1-pattern, the corresponding subsequence with the most repetitions of that 1-pattern (i.e., the longest subsequence) is identified (step 218). Valid complex patterns are identified, along with their corresponding longest subsequences (step 220). A complex pattern is a pattern consisting of more than one (1) event.

Figure 3:
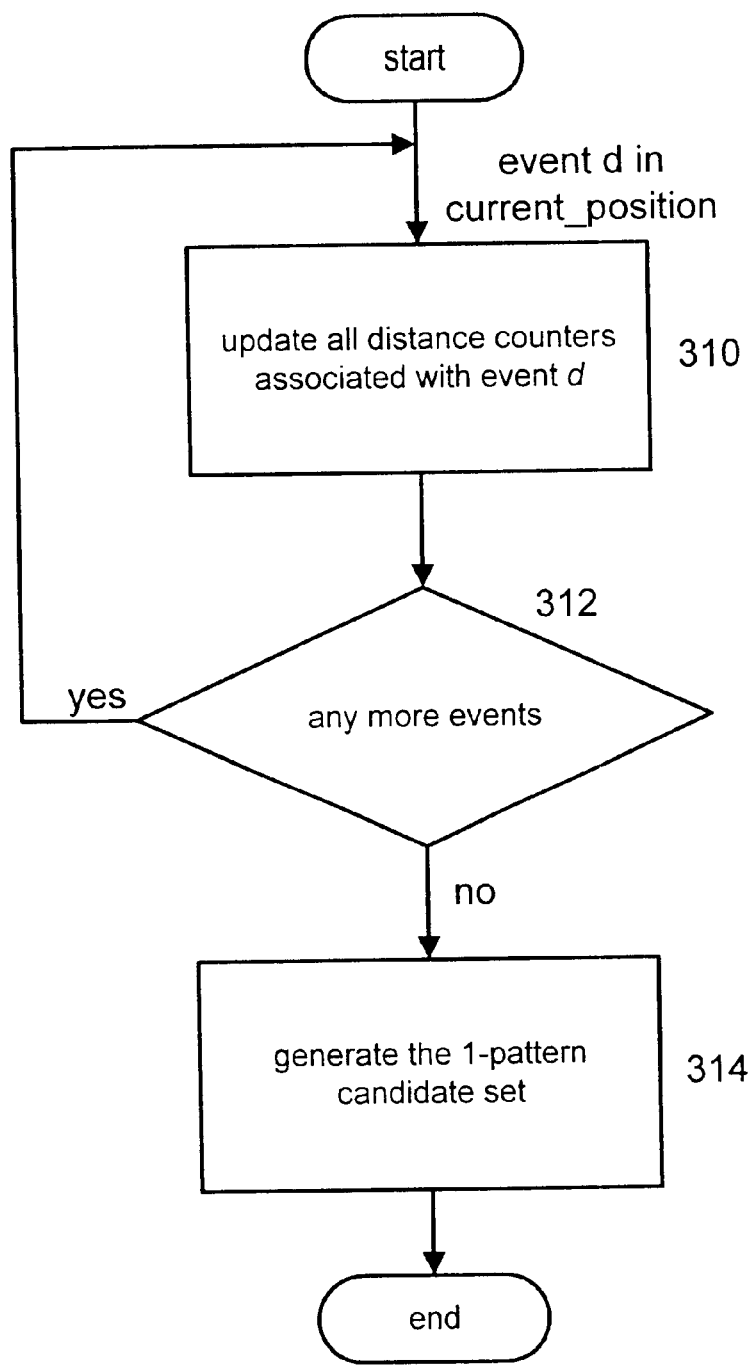
FIG. 3 is a diagram illustrating the process of distance-based pruning (step 101 of FIG. 1), according to an illustrative embodiment of the invention.

FIG. 3 is a diagram illustrating the process of distance-based pruning (step 101 of FIG. 1), according to an illustrative embodiment of the invention. The event sequence is scanned to identify each event therein. Step 310 below is performed for each event in the event sequence.

For a given event d in the currently processed position (current_position) of the input sequence, all distance counters associated with the given event d are updated (step 310). The distance counters are used to determined the positions of events in the event sequence. It is determined whether there exists any more events in the event sequence (step 312). If so, the process returns to step 310 (to process the next event in the sequence). Otherwise, the 1-pattern candidate set is generated (step 312), and then the method is terminated.

Figure 4:
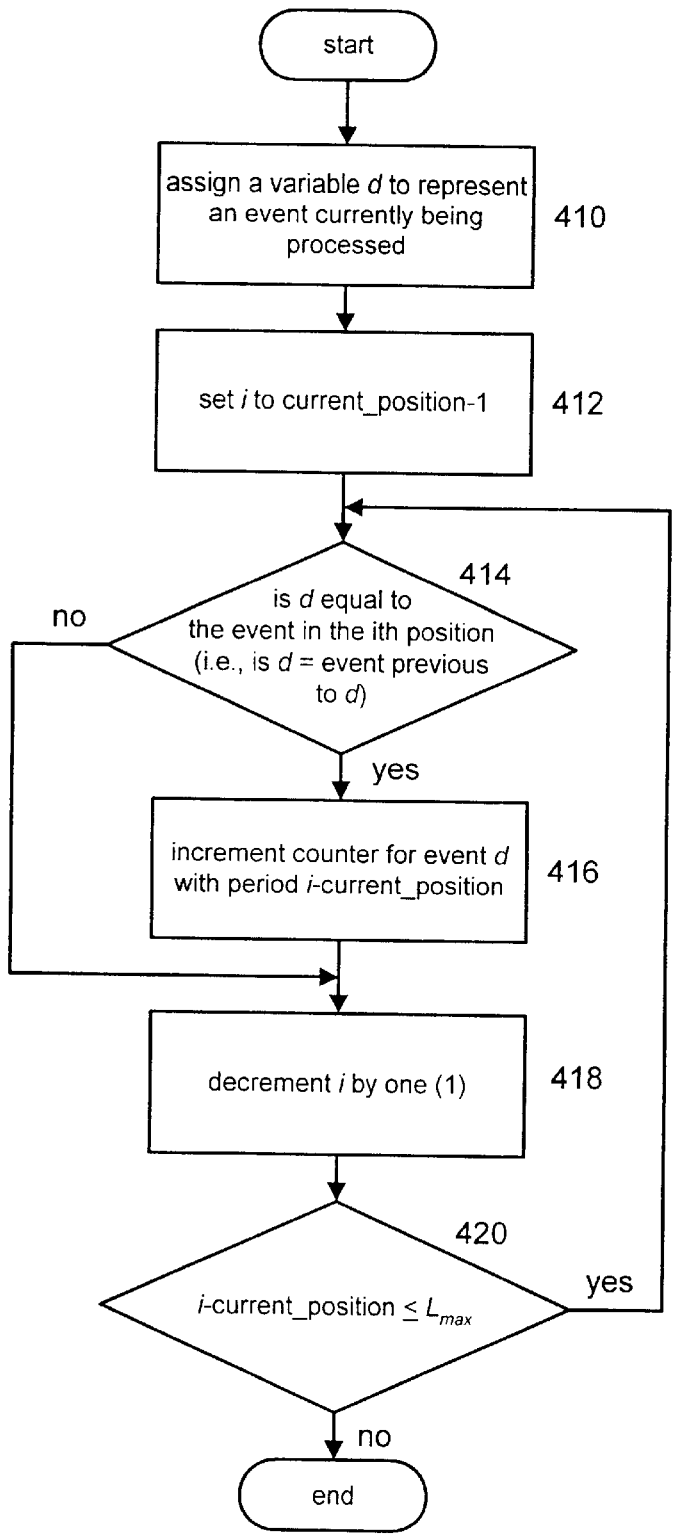
FIG. 4 is a diagram illustrating the process of updating the distance counters (step 310 of FIG. 3), according to an illustrative embodiment of the invention.

FIG. 4 is a diagram illustrating the process of updating the distance counters (step 310 of FIG. 3), according to an illustrative embodiment of the invention. A variable d is assigned to represent an event currently being processed (step 410). A variable i is set to the value of the current_position minus one (1) (that is, current_position−1) (step 412). It is then determined whether d is equal to the event in the ith position in the sequence (i.e., the event previous to d) (step 414). If so, the counter for event d, with a period of i-current_position, is incremented (where current_position is equal to the position of the event currently being processed) (step 416), and the process proceeds to step 418. Otherwise, the process proceeds to step 418.

At step 418, the value of i is decremented by one (1). It is then determined whether the difference between i (i.e., the ith position) and the current_position is less than or equal to $L_{max}$. If so, the process returns to step 414. Otherwise, the process is terminated.

Figure 5:
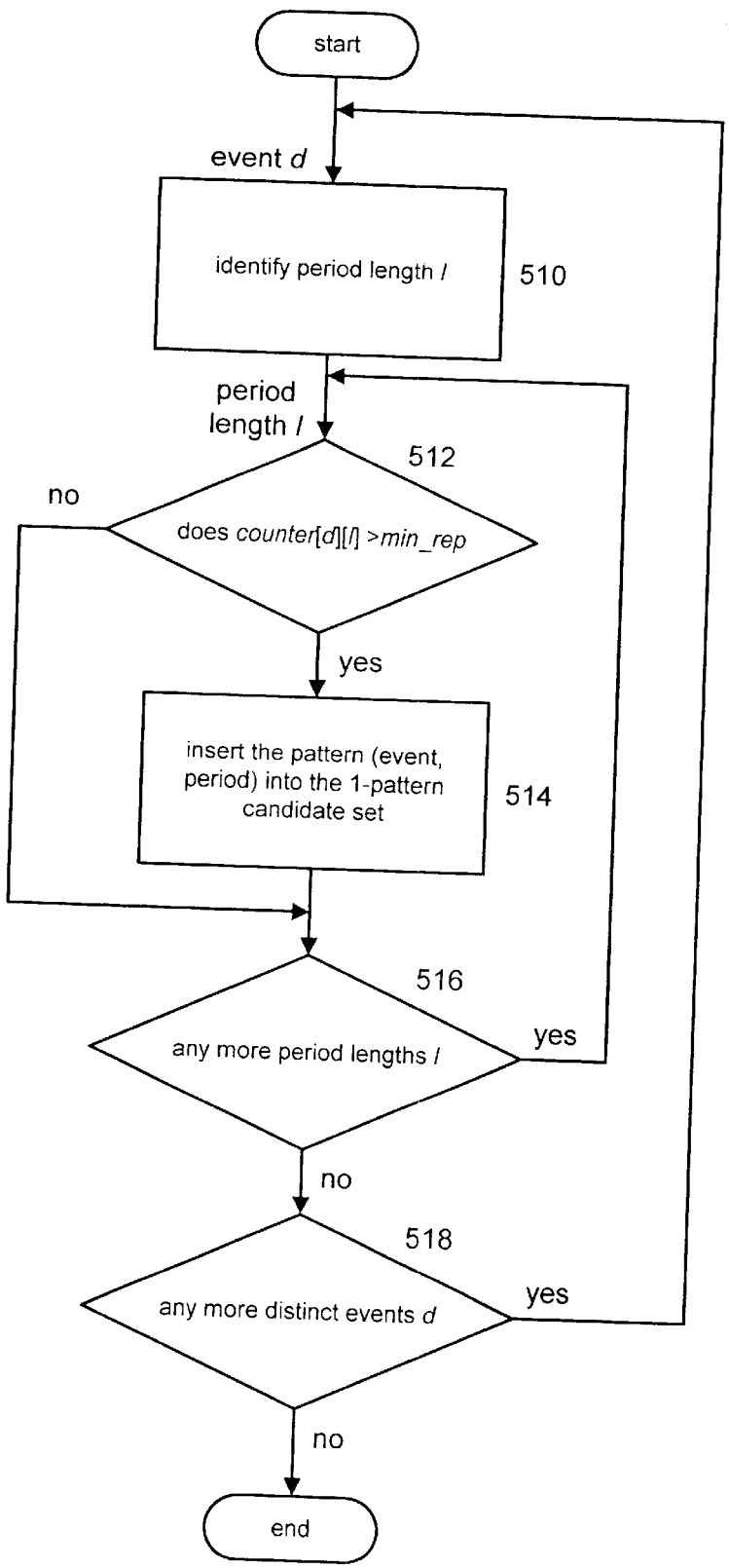
FIG. 5 is a diagram illustrating the process of generating a 1-pattern candidate set from the distance counters (step 314 of FIG. 3), according to an illustrative embodiment of the invention.

FIG. 5 is a diagram illustrating the process of generating a 1-pattern candidate set from the distance counters (step 314 of FIG. 3), according to an illustrative embodiment of the invention. For a distinct event d in the event sequence, each period length l is identified (step 510). For a given period length l, it is determined whether counter[d] [l] is greater than min_rep (step 512). As stated above, min_rep is the (predefined) minimum number of repetitions that a pattern must exhibit in a given subsequence of a given event sequence.

If so, the pattern (d, *, . . . , *) is put into the 1-pattern candidate set (step 514). Note that the inserted pattern includes a event and period. Otherwise, the process proceeds to step 516.

At step 516, it is determined whether there exists any more period lengths l for the distinct event d currently being processed. If so, then the process returns to step 512. Otherwise, it is determined whether there exists any more distinct events d to be processed (step 516). If so, the process returns to step 510. Otherwise, the process is terminated.

Figure 6:
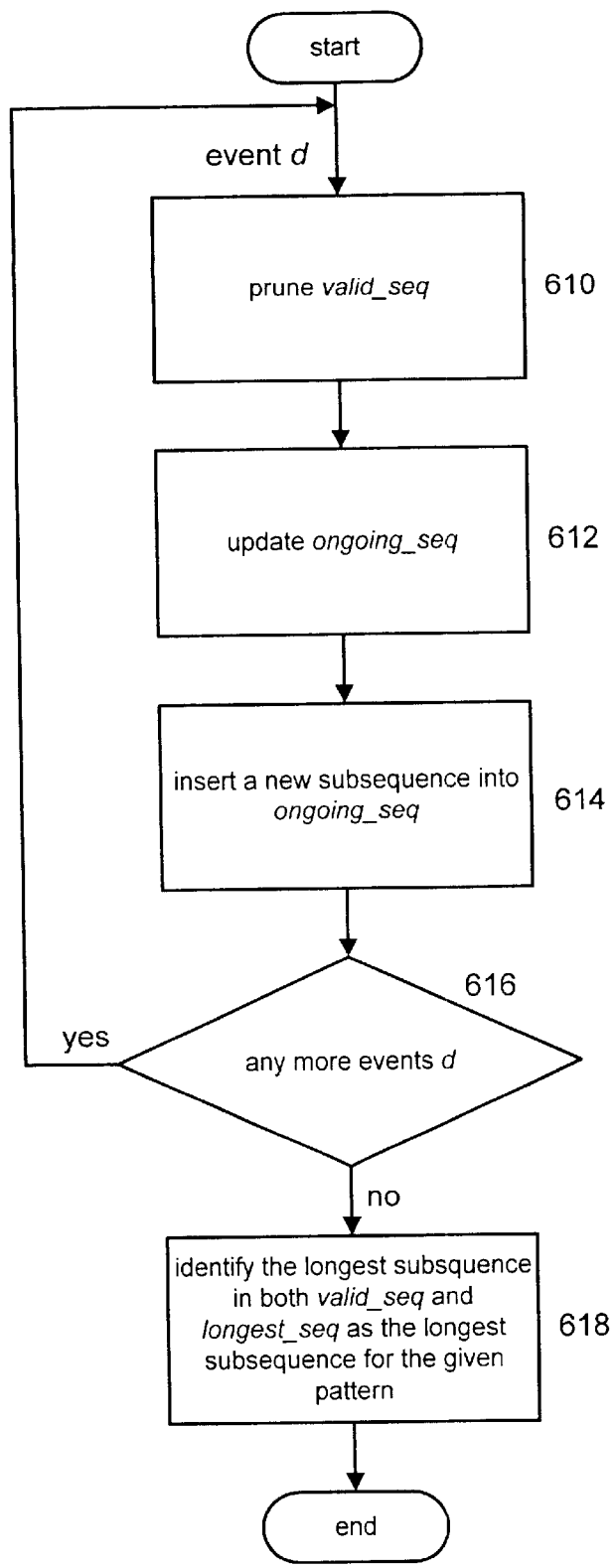
FIG. 6 is a diagram illustrating the process of identifying the longest subsequence in which a given 1-pattern occurs (step 218 of FIG. 2), according to an illustrative embodiment of the invention.

FIG. 6 is a diagram illustrating the process of identifying the longest subsequence in which a given 1-pattern occurs (step 218 of FIG. 2), according to an illustrative embodiment of the invention. As noted above, the longest subsequence of a given 1-pattern is the subsequence in which the most repetitions of that 1-pattern occur.

For an event d in the event sequence, valid_seq is pruned (step 610). Valid_seq is a list of subsequences, wherein each of the subsequences in the list may be extended by appending valid segments thereto. In a preferred embodiment of the invention, valid_seq is implemented using a queue, wherein the subsequences listed in valid_seq are arranged in descending order with respect to their ending positions.

Next, ongoing_seq is updated (step 612). Ongoing_seq is a list that comprises lists of subsequences, wherein each subsequence list has the same ending position, and the last segments of the subsequences are actively growing. In a preferred embodiment of the invention, ongoing_seq is implemented using a queue, wherein all of the subsequences in the same list in ongoing_seq have the same ending position and are arranged in ascending order with respect to their ending positions.

A new subsequence is inserted into ongoing_seq (step 614). It is determined whether there exists any more events d to be processed (step 616). If so, then the process returns to step 610. Otherwise, the longest subsequence in both valid_seq and longest_seq is identified as the longest subsequence for the given pattern (step 618). Longest_seq is the subsequence in sequence_set with the most repetitions. Sequence_set is a list of subsequences which are used for temporary storage.

Figure 7:
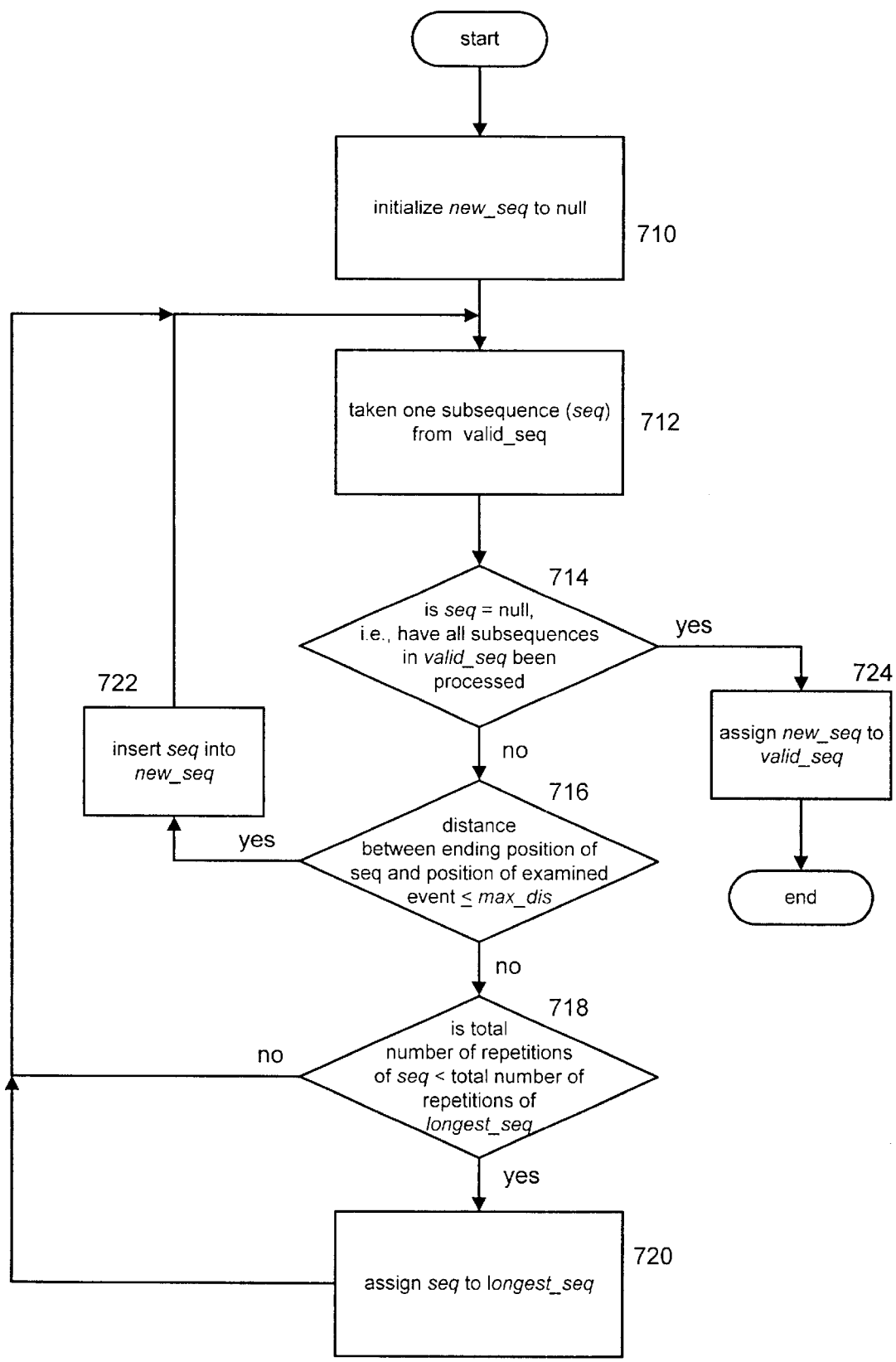
FIG. 7 is a diagram illustrating the procedure for pruning the list of sequences in valid_seq (step 610 of FIG. 6), according to an illustrative embodiment of the invention.

FIG. 7 is a diagram illustrating the procedure for pruning the list of sequences in valid_seq (step 610 of FIG. 6), according to an illustrative embodiment of the invention. New_seq is initialized to NULL (step 710). New_seq is a newly created subsequence.

A subsequence (seq) is taken from the head of valid_seq (step 712). It is determined whether seq is equal to NULL (i.e., all subsequences in valid_seq have been processed) (step 714). If so, then the method proceeds to step 724. Otherwise, it is determined whether the distance between the ending position of subsequence seq (seq.ending) and the position of the examined event (current_position) is less than or equal to max_dis (step 716). As stated above, max_dis is the maximum distance between successive repetitions of a pattern in a given subsequence of a given event sequence.

If so, the process proceeds to step 722. Otherwise, it is determined whether the total number of repetitions of seq is less than the total number of repetitions of the longest sequence, henceforth referred to as longest_seq (note that longest seq happens to be sequence_seq) (step 718). If not, the process returns to step 712. Otherwise, sequence seq is assigned to be longest_seq (step 720), and the process returns to step 712.

At step 722, sequence seq is inserted into new_seq, and the process returns to step 712. At step 724, after all subsequences in valid_seq have been processed, new_seq is assigned to valid_seq.

Figure 8:
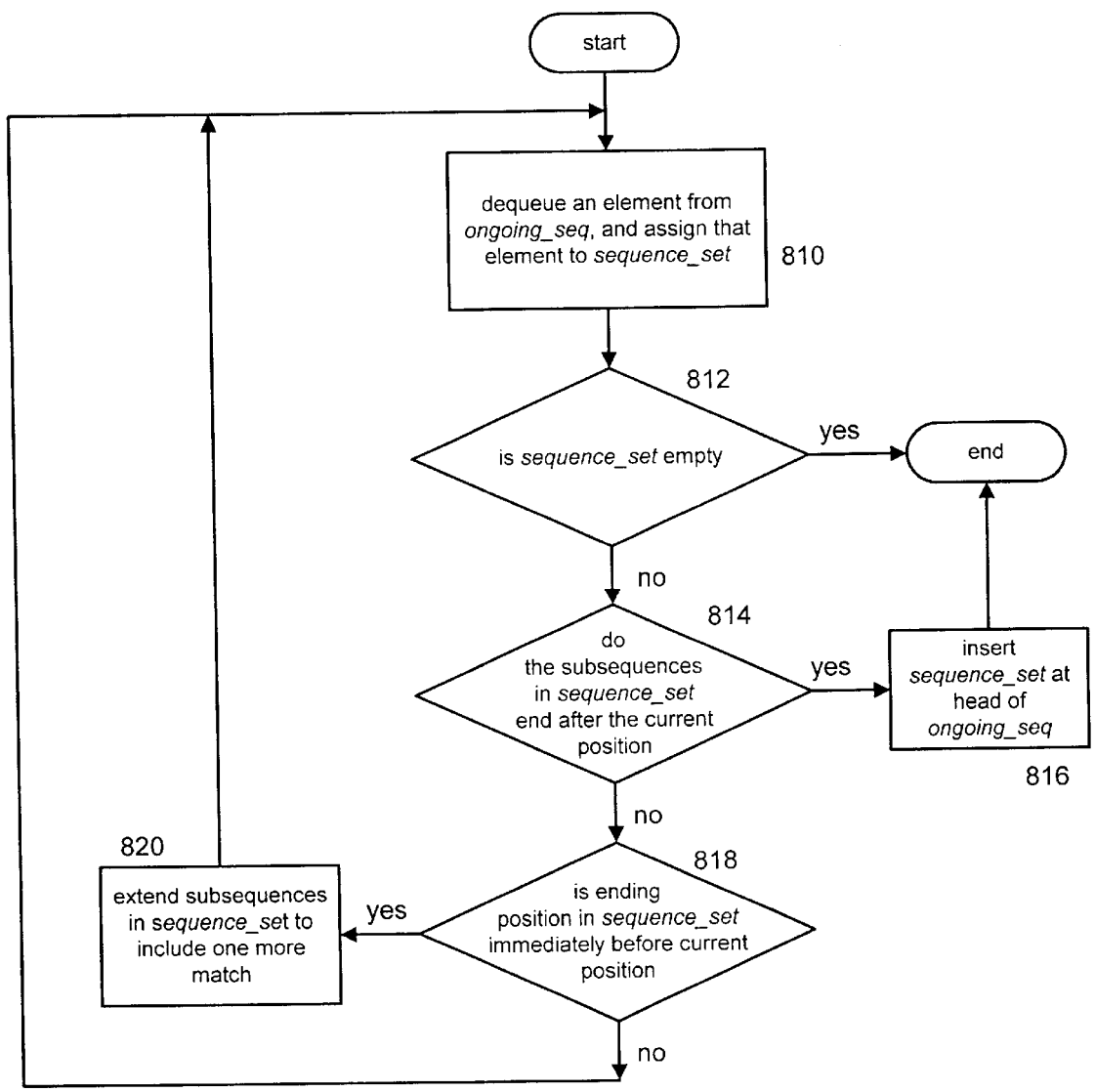
FIG. 8 is a diagram illustrating the process of updating the list of subsequences in ongoing_seq (step 612 of FIG. 6), according to an illustrative embodiment of the invention.

FIG. 8 is a diagram illustrating the process of updating the list of subsequences in ongoing_seq (step 612 of FIG. 6), according to an illustrative embodiment of the invention. First, an element (i.e., a list of sequences) is dequeued from ongoing_seq and assigned to sequence_set (step 810). It is determined whether sequence_set is empty (step 812). As stated above, sequence_set is a list of subsequences which are used for temporary storage. In a preferred embodiment of the invention, sequence_set is implemented using a queue.

If sequence_set is empty, then the process is terminated. Otherwise, it is determined whether the subsequences in sequence_set end after the current position (step 814). If so, then sequence_set is inserted back into the head of ongoing_seq (step 816), and the process is terminated. Otherwise, it is determined whether the ending position in sequence_set (sequence_set.ending) is immediately before the current position (current_position−1) (step 818). If not, then the process returns to step 810. Otherwise, the subsequences in sequence_set are extended to include one more match (i.e., one more occurrence of the pattern) (step 820), and the process returns to step 810.

Figure 9:
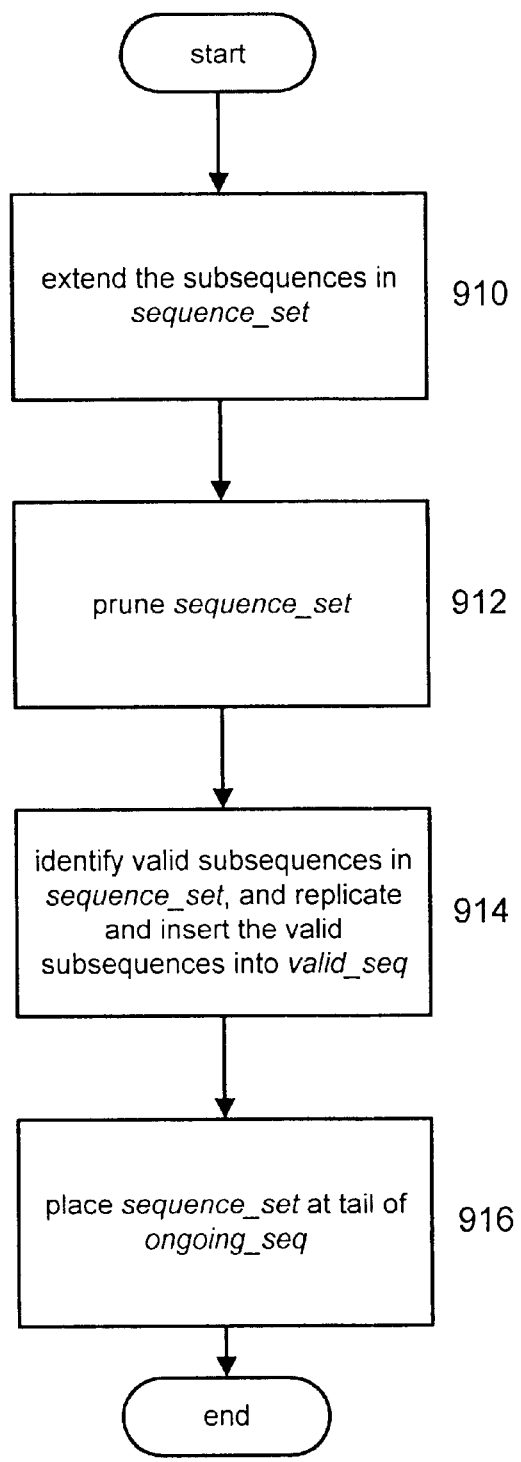
FIG. 9 is a diagram illustrating the process of extending matching subsequences (step 820 of FIG. 8), according to an illustrative embodiment of the invention.

FIG. 9 is a diagram illustrating the process of extending matching subsequences (step 820 of FIG. 8), according to an illustrative embodiment of the invention.

The subsequences in sequence_set are extended to include one more occurrence of the pattern (step 910). Then, sequence_set is pruned (step 912). The valid subsequences in sequence_set are identified, and then those valid subsequences are replicated and inserted into valid_seq (step 914). Sequence_set is then placed at the tail (end) of ongoing_seq (step 916), and the process is terminated.

Figure 10:
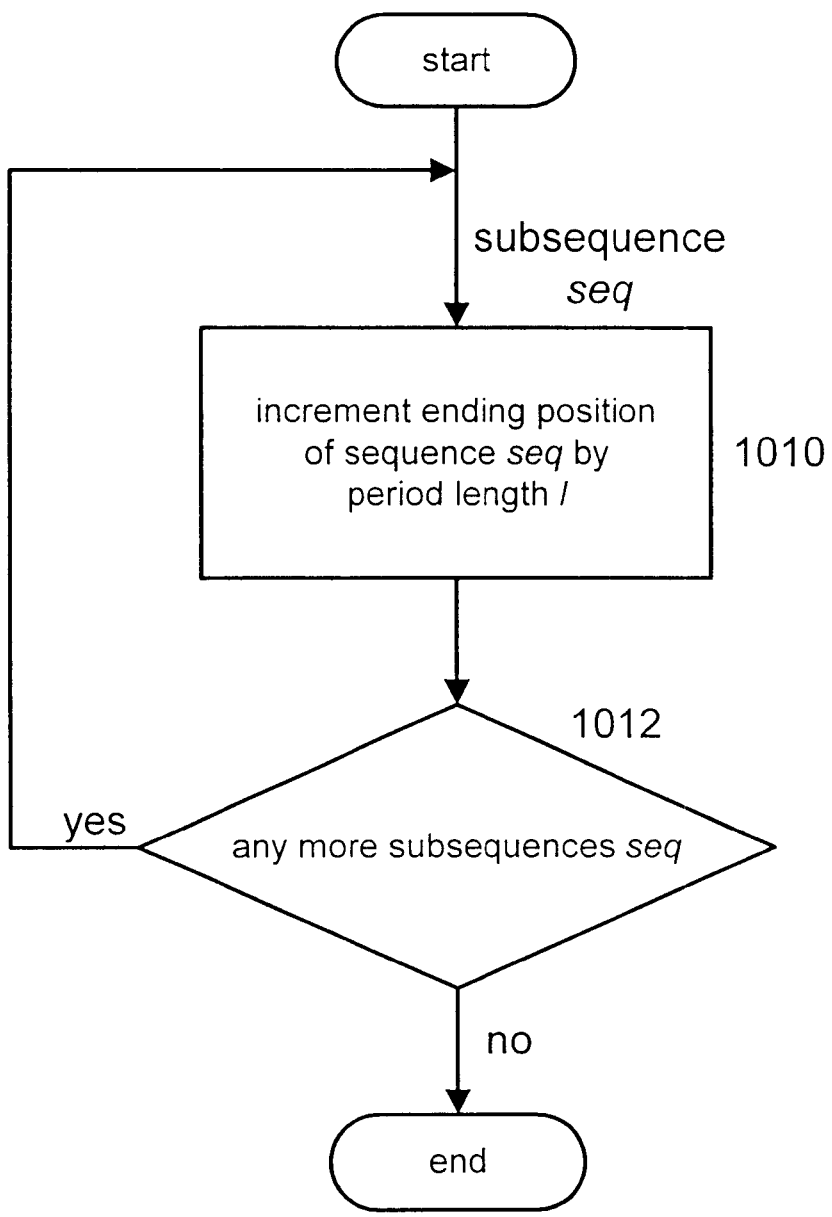
FIG. 10 is a diagram illustrating the process of extending the subsequences in sequence_set (step 801 of FIG. 8), according to an illustrative embodiment of the invention.

FIG. 10 is a diagram illustrating the process of extending the subsequences in sequence_set (step 801 of FIG. 8), according to an illustrative embodiment of the invention. The method of FIG. 10 is performed for each subsequence seq in sequence_set.

For a given subsequence seq in sequence_set, the ending position of the given subsequence seq is incremented by the period length 1 (step 1010). It is determined whether there exists any more subsequences seq in sequence_set (step 1012). If so, the process returns to step 1010. Otherwise, the process is terminated.

Figure 11:
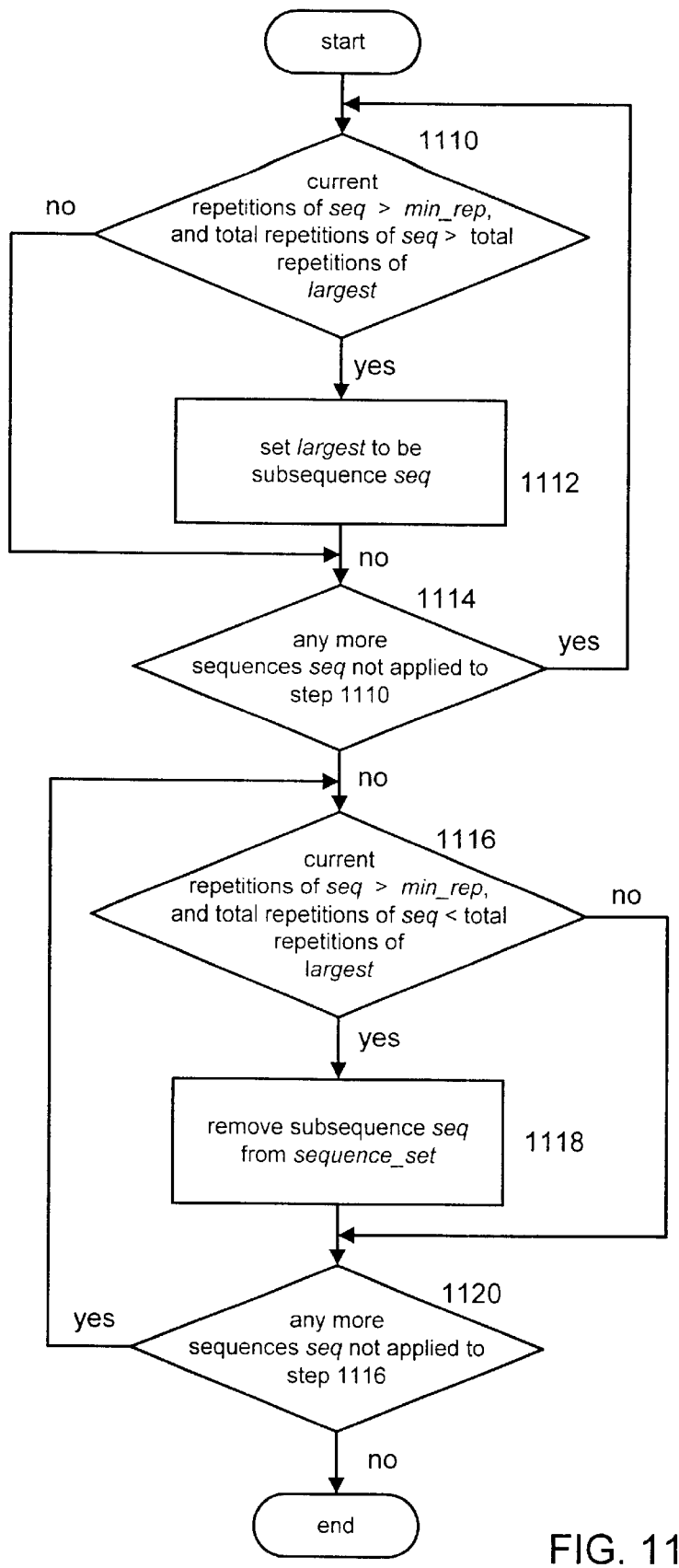
FIG. 11 is a diagram illustrating the process of pruning sequence_set (step 912 of FIG. 9), according to an illustrative embodiment of the invention.

FIG. 11 is a diagram illustrating the process of pruning sequence_set (step 912 of FIG. 9), according to an illustrative embodiment of the invention. Steps 1110, 1112, and 1114 are repeated for each subsequence seq in sequence_set 1001. Steps 1116 and 1118 are also repeated for each subsequence seq in sequence_set 1001.

For a given subsequence seq in sequence_set, it is determined whether the number of current repetitions of the sequence (seq.current_rep) is greater than the min_rep threshold (i.e., is seq valid) and whether the total number of repetitions of the sequence (seq.total_rep) is greater than the total number of repetitions of the largest subsequence found thus far (largest.total_rep) (step 1110). If so, then largest is set to be the given subsequence seq (step 1112), and the process proceeds to step 1114. Otherwise, the process proceeds to step 1114.

At step 1114, it is determined whether there exists any more sequences seq in sequence_set that have not been applied to step 1110. If so, the process returns to step 1110 (to process the next subsequence seq in sequence_set). Otherwise, it is determined whether the number of current repetitions of seq is greater than min_rep (i.e., is seq valid) and whether the total number of repetitions of seq is less than the total number of repetitions of largest (step 1116). If so, then seq is removed from sequence_set, (step 1118), and the process proceeds to step 1120. Otherwise, the process proceeds to step 1120. At step 1120, it is determined whether there exists any more sequences seq in sequence_set that have not been applied to step 1116. If so, the process returns to step 1116. Otherwise, the process is terminated.

Figure 12:
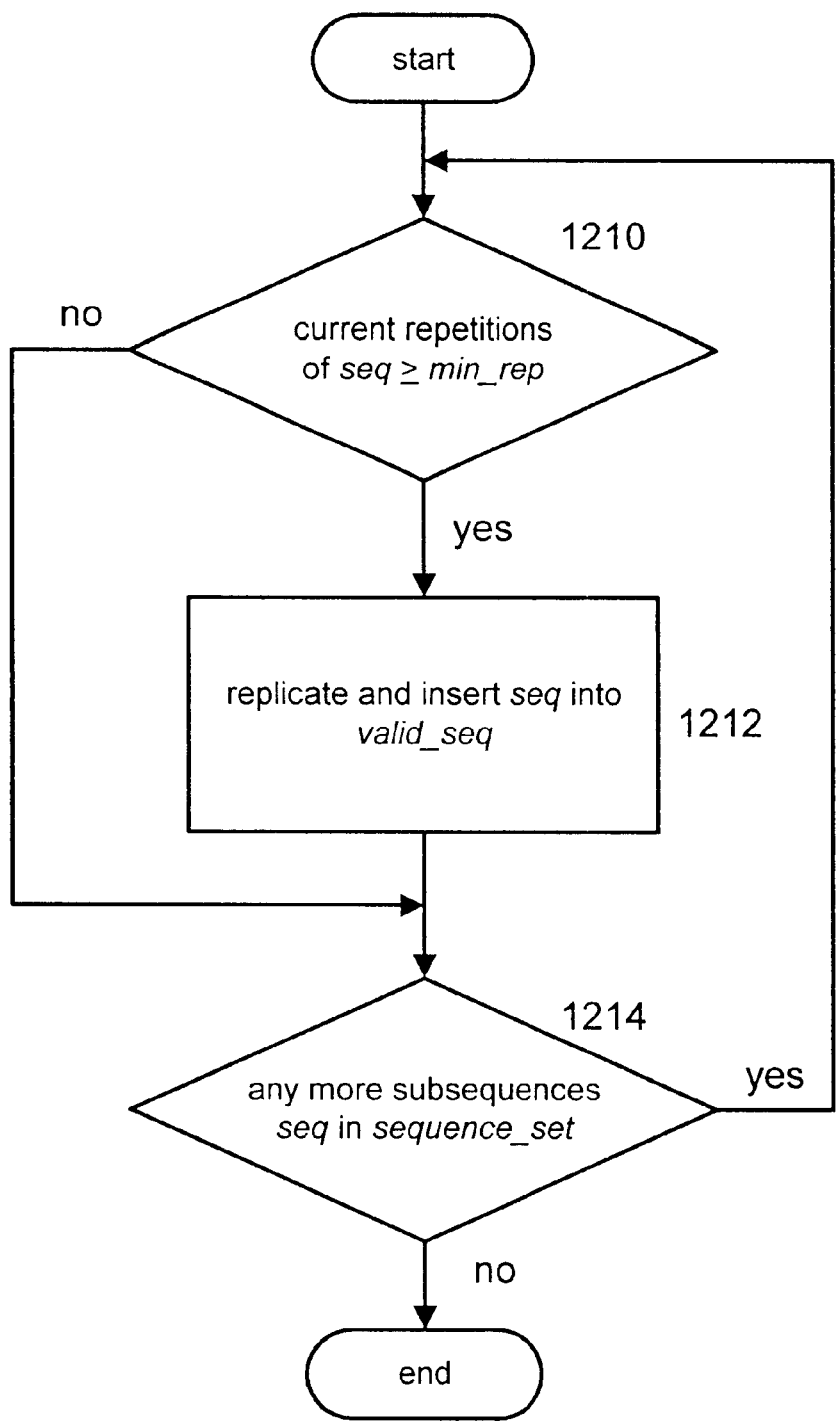
FIG. 12 is a diagram illustrating the process of identifying valid subsequences in sequence_set, and replicating and inserting the valid subsequences into valid_seq (step 914 of FIG. 9), according to an illustrative embodiment of the invention.

FIG. 12 is a diagram illustrating the process of identifying valid subsequences in sequence_set, and replicating and inserting the valid subsequences into valid_seq (step 914 of FIG. 9), according to an illustrative embodiment of the invention. Steps 1210 and 1212 are repeated for each subsequence seq in sequence_set.

For a given subsequence seq in sequence_set, it is determined whether the number of current repetitions of the given subsequence seq is greater than or equal to min_rep (step 1210). If so, the subsequence seq is replicated and inserted into valid_seq (step 1212), and the process proceeds to step 1214. Otherwise, the process proceeds to step 1214.

At step 1214, it is determined whether there exists any more subsequences seq in sequence_set. If so, the process returns to step 1210. Otherwise, the process is terminated.

Figure 13:
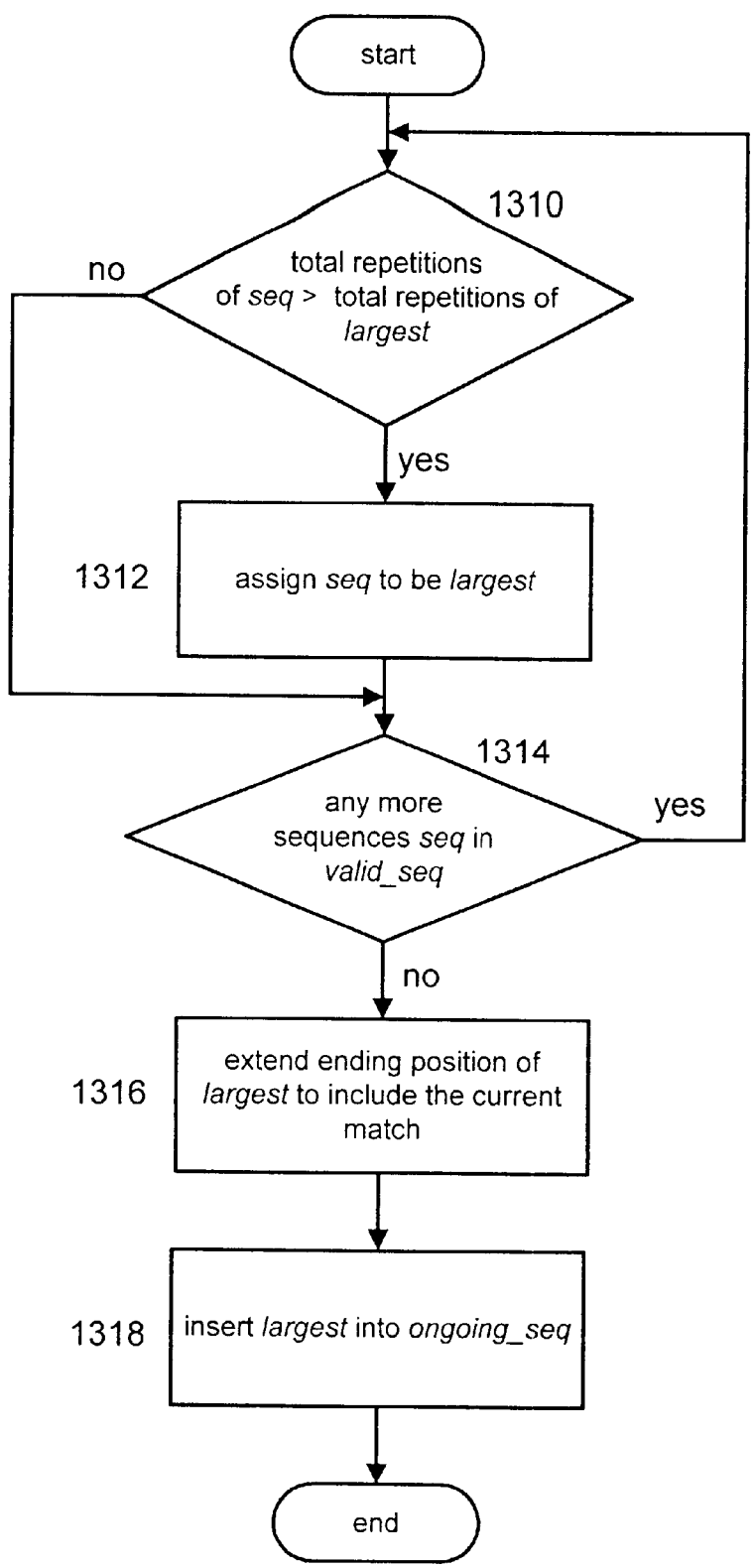
FIG. 13 is a diagram illustrating the process of inserting a new sequence into ongoing_seq (step 614 of FIG. 6), according to an illustrative embodiment of the invention.

FIG. 13 is a diagram illustrating the process of inserting a new sequence into ongoing_seq (step 614 of FIG. 6), according to an illustrative embodiment of the invention. Steps 1310 and 1312 are performed for each sequence seq in valid_seq.

For a given sequence seq in valid_seq, it is determined whether the total number of repetitions of the sequence (seq.total_rep) is greater than the total number of repetitions of the largest subsequence found thus far (largest.total_rep) (step 1310). If so, then subsequence seq is assigned to be largest (step 1312), and the process proceeds to step 1314. Otherwise, the process proceeds to step 1314.

At step 1314, it is determined whether there exists any more subsequences seq in valid_seq. If so, the process returns to step 1310. Otherwise, the ending position of largest (largest.ending) is extended to include the current match (1+current_position−1) (i.e., to include another occurrence of the pattern) (step 1316). Then, largest is inserted into ongoing_seq (step 1318), and the process is terminated.

Figure 14:
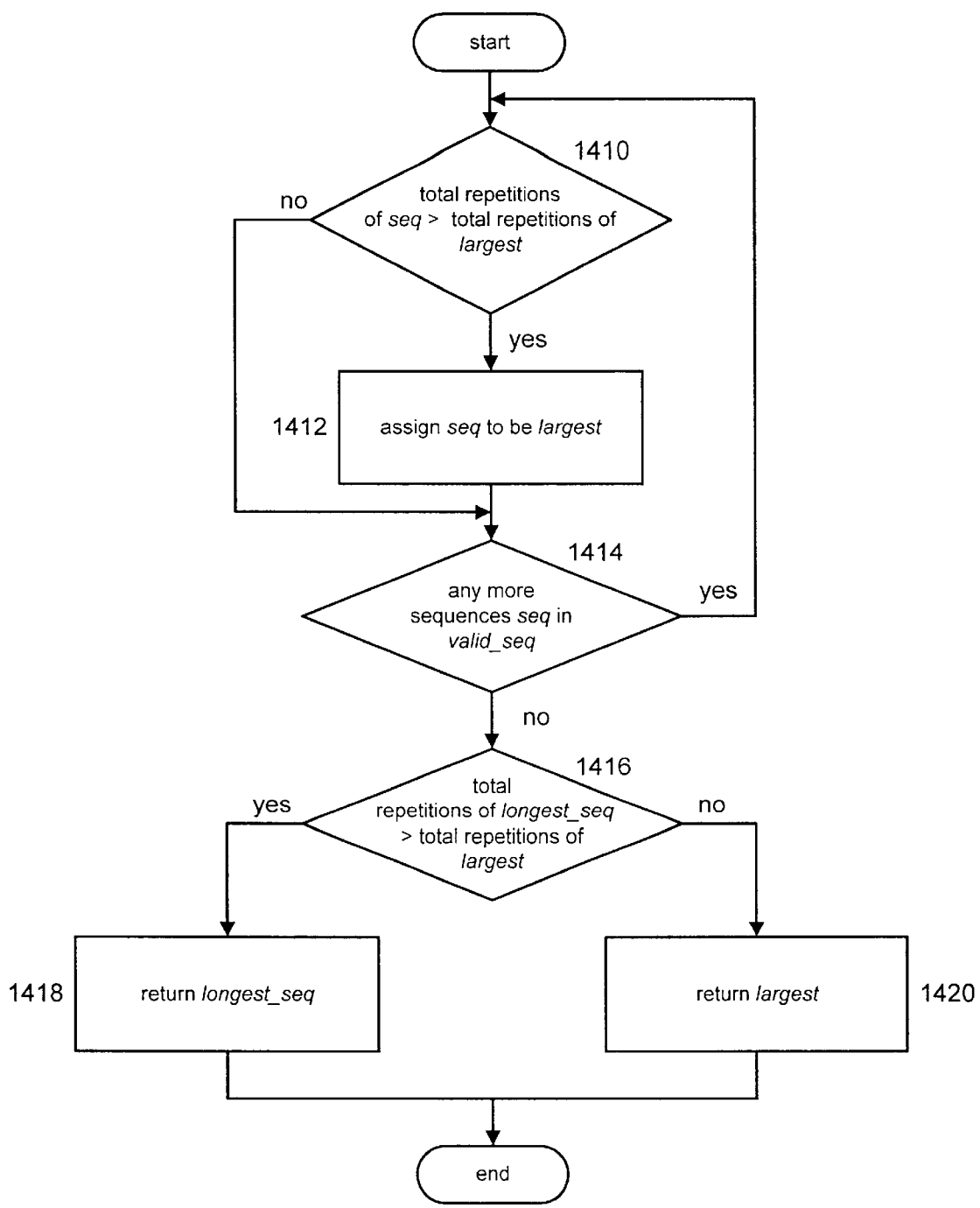
FIG. 14 is a diagram illustrating the process of identifying the subsequence with the most repetitions from the subsequences in sequence_set and the subsequence longest_seq (step XXX of FIG. X), according to an illustrative embodiment of the invention.

FIG. 14 is a diagram illustrating the process of identifying the subsequence with the most repetitions from the subsequences in sequence_set and the subsequence longest_seq (step XXX of FIG. X), according to an illustrative embodiment of the invention.

For a given subsequence seq in valid_seq, it is determined whether the total number of repetitions of the sequence (seq.total_rep) is greater than the total number of repetitions of the largest subsequence found thus far (largest.total_rep) (step 1410). If so, then sequence seq is assigned to largest (step 1412), and the process proceeds to step 1414. Otherwise, the process proceeds to step 1414.

At step 1414, it is determined there exists any more subsequences seq in valid_seq. If so, then the process returns to step 1410. Otherwise, the process proceeds to step 1416.

At step 1416, it is determined whether, the total number of repetitions of longest_seq (longest_seq.total) is greater than the total number of repetitions of largest (largest.total_rep). If so, then longest_seq is returned (step 1418). Otherwise, largest is returned (step 1420).

Figure 15:
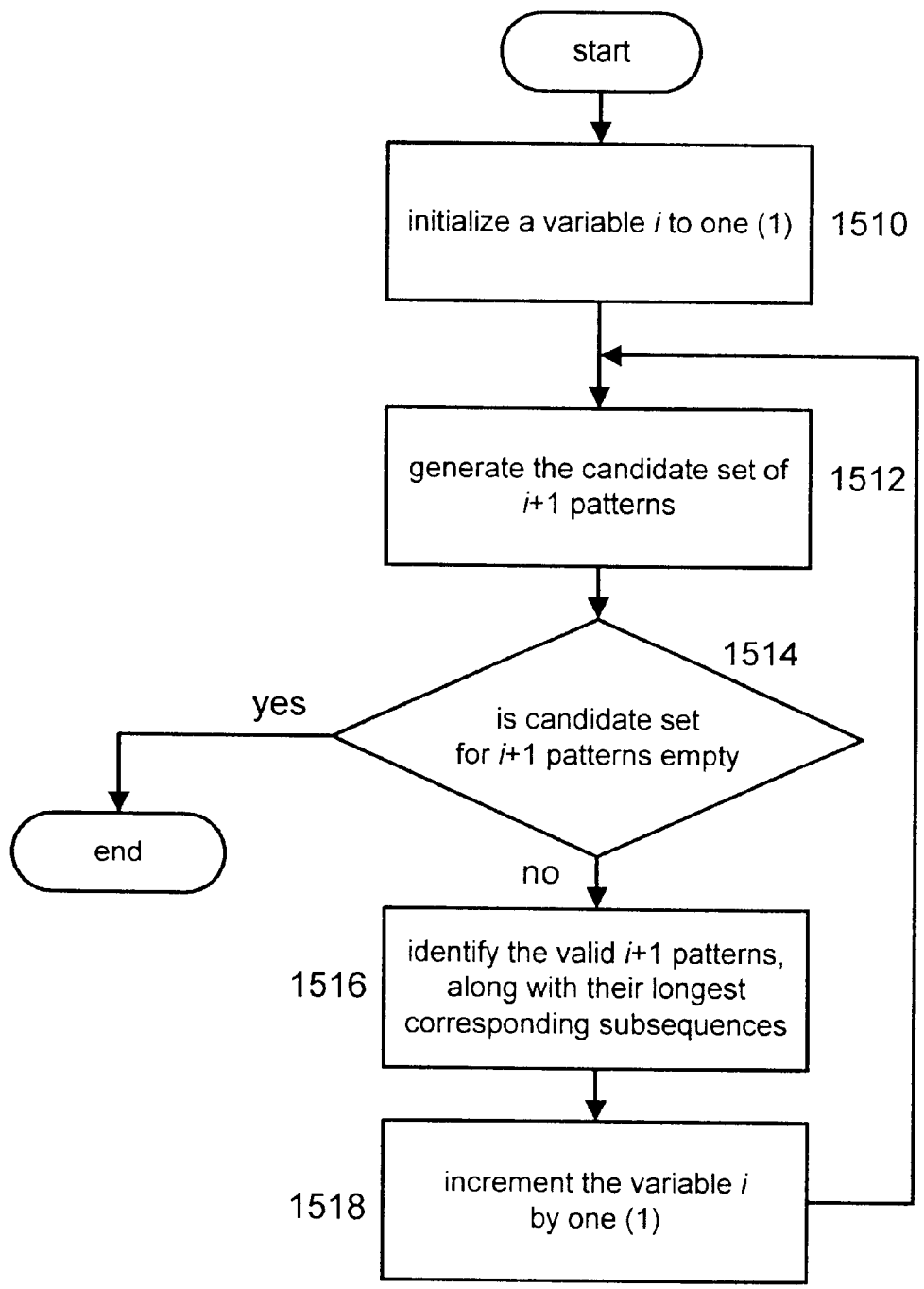
FIG. 15 is a diagram illustrating the process of identifying complex patterns (step 220 of FIG. 2), according to an illustrative embodiment of the invention.

FIG. 15 is a diagram illustrating the process of identifying complex patterns (step 220 of FIG. 2), according to an illustrative embodiment of the invention.

A variable i is initialized to one (1) (step 1510). Upon identification of the valid i-patterns (step 220 of FIG. 2), the candidate set of i+1 patterns is generated (step 1512). If $(d_1, *, *)$ and $(d_2, *, *)$ are valid, then $(d_1, d_2, *)$, $(d_1, *, d_2)$, $(d_2, d_1, *)$, and $(d_2, *, d_1)$ are candidates for valid 2-patterns.

It is determined whether the candidate set for i+1 patterns is empty (step 1514). If so, then the process is terminated. Otherwise, the valid i+1 patterns are identified along with their longest corresponding subsequences (step 1516). The variable i is incremented by one (1) (step 1518), and the process returns to step 1512.

A brief description of some of the aspects and advantages of the invention will now be given. The invention allows a pattern to be partially specified, e.g., $(d, *, *)$. Thus, a more flexible model of asynchronous periodic patterns is advantageously provided which allows mining of all patterns whose periods may cover a wide range and are not known apriori. The model of the invention may be used when all of the patterns are present only within a subsequence of an event sequence. Moreover, the model may be used for all patters whose occurrences are misaligned due to the insertion of some random disturbance. A two phase method is provided to first generate potential periods by distance-based pruning followed by an iterative procedure to derive and validate candidate patterns and locate the longest valid subsequence containing each pattern.

It is to be appreciated that although some of the variables (e.g., list of subsequences such as valid_seq, sequence_set, and so forth) utilized by the present invention have been described in terms of queues, one of ordinary skill in the related art will readily contemplate many other ways in which to implement these variables that fall within the spirit and scope of the present invention.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for identifying partial periodic patterns in an event sequence, each pattern comprising a list of events from the event sequence, said method comprising the steps of:

identifying at least one subsequence of the event sequence and at least one pattern in the at least one subsequence, such that the at least one pattern exceeds a minimum number of repetitions in the at least one subsequence, and a distance between successive repetitions of the at least one pattern in the at least one subsequence does not exceed a predefined threshold; and storing at least one of the at least one pattern and the at least one subsequence.

2. The method according to claim 1, wherein each of the events in a given pattern is one of distinct and non-distinct, and each non-distinct event matches any of the distinct events.

3. The method according to claim 1, wherein said method is implemented by a program storage device readable by machine, tangibly embodying a program of instructions executable by the machine to perform said method steps.

4. A method for identifying partial periodic patterns in an event sequence, each pattern comprising a list of events from the event sequence, said method comprising the steps of:

identifying a set CPP of candidate pattern periods and a plurality of sets CE of candidate events, wherein each candidate pattern period in the set CPP corresponds to one of the plurality of sets CE of candidate events;

identifying at least one pattern comprised of the candidate events in one of the plurality of sets CE and having a same period as the corresponding candidate pattern period in the set CPP, and identifying at least one subsequence of the event sequence that comprises the at least one pattern, such that the at least one pattern exceeds a minimum number of repetitions in the at least one subsequence, and a distance between successive repetitions of the at least one pattern in the at least one subsequence does not exceed a predefined distance threshold; and storing at least one of the at least one pattern and the at least one subsequence.

5. The method according to claim 4, wherein the period of each of the candidate pattern periods in the set CPP is shorter than a pre-specified maximum period length.

6. The method according to claim 4, wherein the at least one subsequence is a longest event subsequence comprising the at least one pattern.

7. The method according to claim 4, wherein said step of identifying the set CPP of candidate pattern periods and the plurality of sets CE of candidate events comprises the steps of:

initializing a plurality of distance counters, each distance counter being associated with one of a plurality of event and period combinations, each combination being comprised of one of the periods from the set CPP and one of the events from the corresponding set CE of candidate events;

updating a value of each of the distance counters to reflect a distance from the associated event to a previous occurrence of the associated event; and identifying the event and period combinations such that the value of the distance counters associated with each of the identified combinations exceeds the minimum number of repetitions.

8. The method according to claim 4, wherein each of the periods in the plurality of event and period combinations is less than the pre-specified maximum period length.

9. The method according to claim 4, wherein said step of identifying the set CPP of candidate pattern periods and the plurality of sets CE of candidate events comprises the steps of:

identifying singular patterns and subsequences that comprise the singular patterns, wherein each singular pattern has only one position filled by one of the events in the event sequence; and identifying and validating complex patterns, wherein each complex pattern has more than one position filled by one of the events in the event sequence.

10. The method according to claim 9, further comprising the step of validating singular patterns.

11. The method according to claim 10, wherein said validating step comprises the step of:

for each occurrence of a given singular pattern:

pruning subsequences comprised in a set Z of subsequences, each subsequence in the set Z corresponding to one of the event and period combinations, each period in the corresponding event and period combinations being associated with a given pattern, the given pattern exceeding a minimum number of repetitions in a given subsequence in the set Z, and a distance between successive repetitions of the given pattern in the given subsequence does not exceeding a predefined distance threshold; and updating subsequences comprised in a set Y based upon ending positions of the subsequences in the set Y, the set Y comprising a list of lists of subsequences, wherein each of the subsequences in the lists comprised in the set Y have a same ending position.

12. The method according to claim 11, wherein said step of pruning the subsequences in the set Z comprises the steps of:

removing all subsequences from the set Z that end more than the predefined distance threshold from a current position of the given singular pattern in a subsequence in the set Z; and updating a set X, the set X comprising a subsequence in a seq W of subsequences, the subsequence in the set X having more repetitions of the given singular pattern than any of the other subsequences in the set W, each subsequence in the set W being subject to further processing, said updating being performed when the subsequence in the set X has less repetitions than any of the subsequences removed from the set Z.

13. The method according to claim 11, wherein said step of updating the subsequences comprised in the set Y comprises the steps of:
removing all of the subsequences from the set Y that end prior to an immediately preceding position with respect to a currently processed position in the event sequence;
extending the subsequences in the set Y that end exactly at the immediately proceeding position to include a current repetition of the given singular pattern; and
extending the longest subsequence in the set Z by one repetition of the given singular pattern and inserting the longest subsequence into set Y.

14. The method according to claim 13, wherein said step of extending the subsequences in the set Y that end exactly at the immediately preceding position comprises of the step of removing subsequences having less repetitions than a longest subsequence in the set Y, when a number of repetitions of a last segment of the extended subsequences exceeds the predefined threshold.

15. The method according to claim 12, further comprising the step of maintaining at least one data structure for storing the subsequences in the sets Z, Y, X, and W.

16. The method according to claim 15, wherein the at least one data structure is a queue.

17. The method according to claim 15, wherein each of the subsequences in the set Z are arranged in ascending order with respect to ending positions thereof.

18. The method according to claim 15, wherein each of the subsequences in the set Y are arranged in ascending order with respect to ending positions thereof.

19. The method according to claim 9, wherein the events in the event sequence are one of distinct and non-distinct, and said step of identifying and validating the complex patterns comprises the steps of:
identifying a set I of candidate i-patterns from a set J of valid (i−1)-patterns, each i-pattern comprising i events, each (i−1)-pattern comprising i−1 events;
validating the set I of candidate i-patterns; and
repeating said steps of identifying and validating the set I of i-patterns, until one of the set J is empty and all positions of each of the patterns in the set J are filled by distinct events.

20. The method according to claim 19, wherein said step of identifying the set I of candidate i-patterns comprises the steps of:
for a given valid (i−1)-pattern P in the set W:
identifying an i-pattern P' by replacing one of the non-distinct events in the given valid (i−1)-pattern P with one of the distinct events; and
identifying P' as a candidate i-pattern, when replacing one of the distinct events in P' by one of the non-distinct events would produce a valid (i−1)-pattern and no new i-pattern can be identified.

21. The method according to claim 4, wherein said method is implemented by a program storage device readable by machine, tangibly embodying a program of instructions executable by the machine to perform said method steps.

22. A method for identifying partial periodic patterns in an event sequence, each pattern comprising a list of events from the event sequence, said method comprising the steps of:
specifying a minimum number of repetitions of a pattern within a subsequence of the event sequence, and a maximum distance between successive repetitions of the pattern within the subsequence;
identifying patterns of events in the event sequence and subsequences of the event sequence that comprise the patterns; and
storing only the patterns and subsequences such that a stored pattern exceeds the minimum number of repetitions within a stored subsequence and the successive repetitions of the stored pattern within the stored subsequence do not exceed the maximum distance.

23. The method according to claim 22, wherein said method is implemented by a program storage device readable by machine, tangibly embodying a program of instructions executable by the machine to perform said method steps.

* * * * *